United States Patent [19]

Swartz et al.

[11] Patent Number: 4,593,186

[45] Date of Patent: Jun. 3, 1986

[54] PORTABLE LASER SCANNING SYSTEM AND SCANNING METHODS

[75] Inventors: Jerome Swartz, Stonybrook; Edward Barkan, South Setauket; Shelley Harrison, Dix Hills, all of N.Y.

[73] Assignee: Symbol Technologies, Inc., Hauppauge, N.Y.

[21] Appl. No.: 543,878

[22] Filed: Oct. 20, 1983

Related U.S. Application Data

[60] Continuation of Ser. No. 378,919, May 17, 1982, abandoned, which is a division of Ser. No. 125,768, Feb. 29, 1980, Pat. No. 4,387,297.

[51] Int. Cl.⁴ .......................... G06K 9/24; G06K 7/10
[52] U.S. Cl. ...................................... 235/472; 382/59
[58] Field of Search .................. 232/472, 462; 382/59; 250/566, 568, 214; 350/96.10

[56] References Cited

U.S. PATENT DOCUMENTS

| | | | |
|---|---|---|---|
| Re. 28,285 | 12/1974 | Schanne | 235/61.11 E |
| 3,076,957 | 2/1963 | Hankes et al. | 340/173 |
| 3,229,075 | 1/1966 | Palti | 235/61.11 |
| 3,622,758 | 11/1971 | Schanne | 235/61.11 E |
| 3,665,164 | 5/1972 | Beveridge et al. | 235/61.11 E |
| 3,676,645 | 7/1972 | Fickenscher et al. | 235/61.11 E |
| 3,685,723 | 8/1972 | Berler | 235/61.11 E |
| 3,699,312 | 10/1972 | Jones et al. | 235/61.11 E |
| 3,728,677 | 4/1973 | Munson | 340/146.3 F |
| 3,735,096 | 5/1973 | Knockeart et al. | 235/61.11 E |
| 3,780,271 | 12/1973 | Sharkitt et al. | 235/61.11 E |

(List continued on next page.)

FOREIGN PATENT DOCUMENTS

| | | |
|---|---|---|
| 0016400 | 10/1980 | European Pat. Off. ............. 382/59 |
| 2036218 | 2/1971 | Fed. Rep. of Germany . |
| 2208459 | 5/1973 | Fed. Rep. of Germany . |
| 2332595 | 1/1974 | Fed. Rep. of Germany . |
| 589326 | 4/1977 | Switzerland . |
| 1252108 | 11/1971 | United Kingdom . |
| 1397995 | 6/1975 | United Kingdom . |
| 1441137 | 6/1976 | United Kingdom . |
| 1449366 | 9/1976 | United Kingdom . |
| 1468624 | 3/1977 | United Kingdom . |
| 1480293 | 7/1977 | United Kingdom . |
| 1481654 | 8/1977 | United Kingdom . |
| 1504869 | 3/1978 | United Kingdom . |
| 1547268 | 6/1979 | United Kingdom . |

OTHER PUBLICATIONS

BAR CODE NEWS, Jul./Aug. 1984, p. 64.
BAR CODE NEWS, Jan./Feb. 1984, p. 44.
IBM Technical Disclosure Bulletin, vol. 21, No. 11 (Apr. 1979).
NEC Research & Development News, No. 55, pp. 137-138 (Oct. 1979).
IBM Technical Disclosure Bulletin, vol. 22, No. 9 (Feb. 1980).
Electronics, vol. 53, No. 27, p. 46 (Dec. 1980).
Lexicon der Technik, Lueger, p. 16, 1972.

Primary Examiner—Donald J. Yusko
Attorney, Agent, or Firm—Kirschstein, Kirschstein, Ottinger & Israel

[57] ABSTRACT

An entirely field-portable laser scanning system for reading boar code symbols includes a light-weight and small-sized laser scanning head. The laser source, power supply component, optics, scanning elements, sensor circuit, and signal processing circuitry are specially designed for minimal size and weight and volume such that they can all be mounted in the head. The head can be bracket-mounted or hand-held. The housing for the head can be provided with a handle grip, or can be gun-shaped. High-speed oscillating scanning motors and/or penta-bimorph scanners are used as scanning elements. A trigger initiates repetitive scanning of each object bearing a symbol, and an indicator indicates when the scanning of that particular object has been terminated. A body harness supports the remaining scanner system circuitry. A non-bulky, freely-movable cable interconnects the head to the body harness. Methods of scanning the symbol and of operating the system are also disclosed.

16 Claims, 16 Drawing Figures

U.S. PATENT DOCUMENTS

| | | | |
|---|---|---|---|
| 3,812,347 | 5/1974 | Cunningham et al. | 250/219 DC |
| 3,812,374 | 5/1974 | Tuhro | 250/568 |
| 3,916,158 | 10/1975 | Sansone et al. | 235/61.11 E |
| 3,947,816 | 3/1976 | Rabedeau | 340/146.3 Z |
| 3,964,022 | 6/1976 | Martin | 340/146.3 Z |
| 3,976,973 | 8/1976 | Martin et al. | 340/146.3 F |
| 3,991,883 | 11/1976 | Hobler et al. | 209/73 |
| 3,995,166 | 11/1976 | Hobart et al. | 250/566 |
| 4,007,377 | 2/1977 | Simon et al. | 250/566 |
| 4,011,435 | 3/1977 | Phelps et al. | 235/61.11 E |
| 4,019,026 | 4/1977 | Nakanishi et al. | 235/61.11 E |
| 4,020,357 | 4/1977 | Punis | 250/568 |
| 4,025,761 | 5/1977 | Hayosh et al. | 235/61.11 E |
| 4,088,981 | 5/1978 | Gott | 340/146.3 SY |
| 4,128,298 | 12/1978 | McMillan | 350/96.10 |
| 4,143,358 | 3/1979 | Neff | 382/59 |
| 4,158,194 | 6/1979 | McWaters et al. | 382/59 |
| 4,180,204 | 12/1979 | Koenig et al. | 382/59 |
| 4,251,798 | 2/1981 | Swartz et al. | 382/59 |
| 4,289,957 | 9/1981 | Neyroud et al. | 235/462 |
| 4,409,470 | 10/1983 | Shepard et al. | 235/472 |

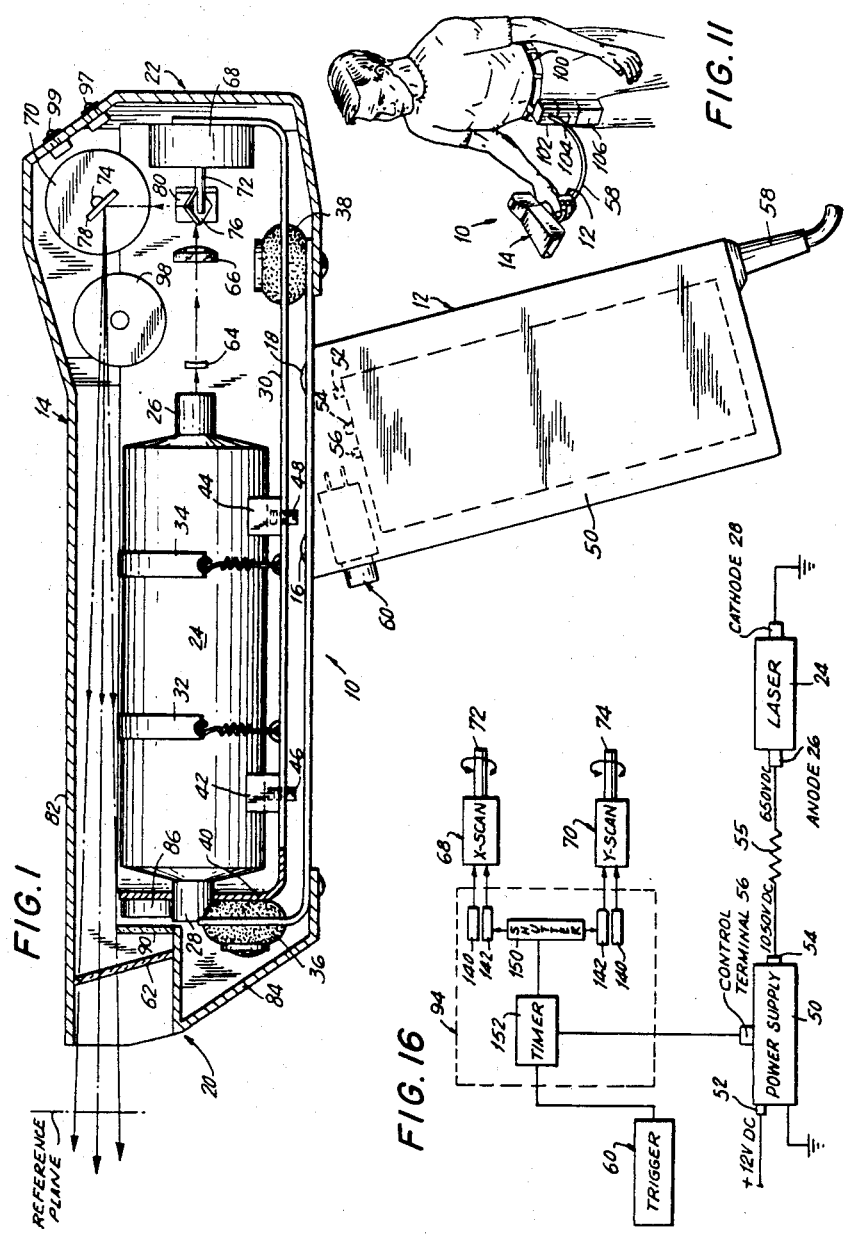

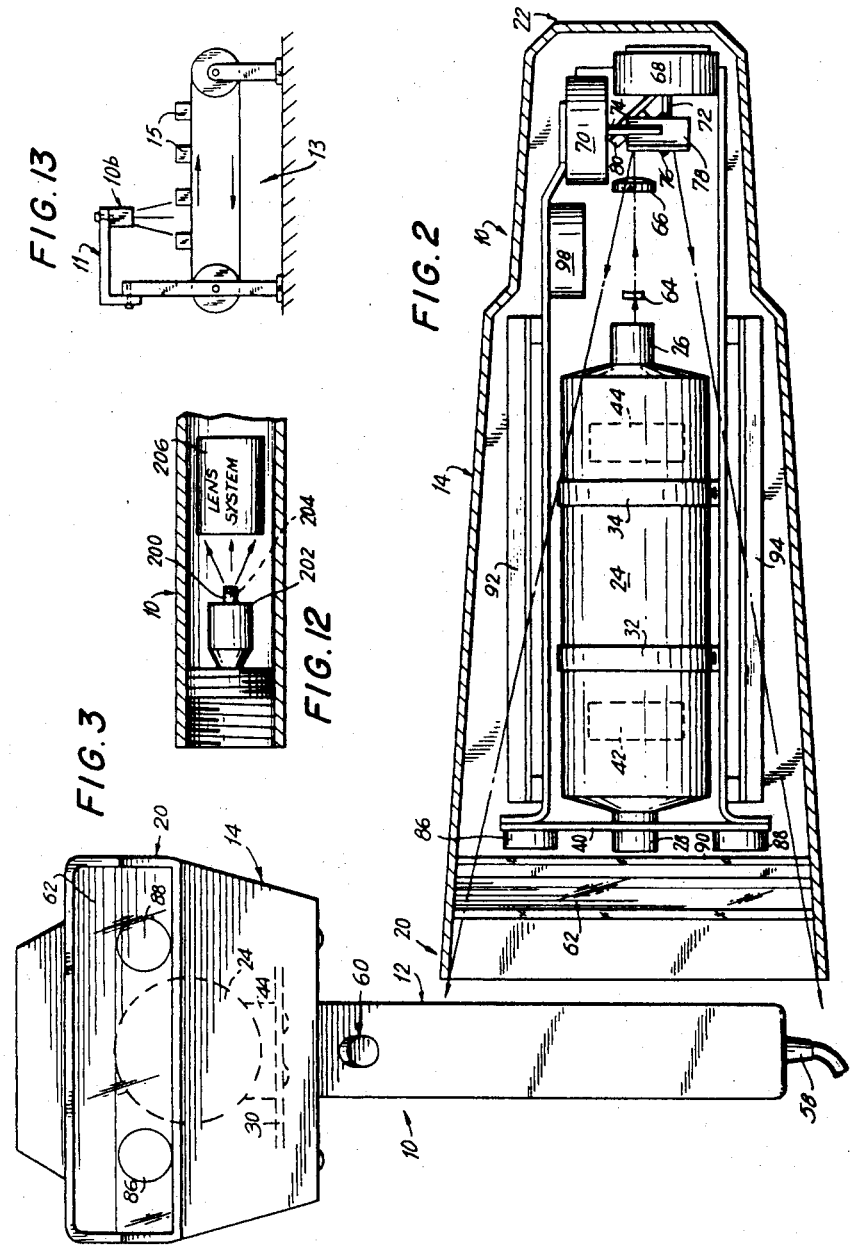

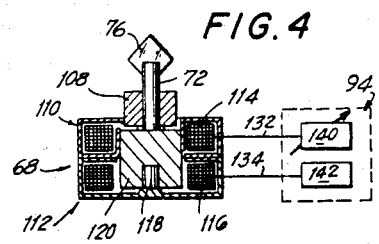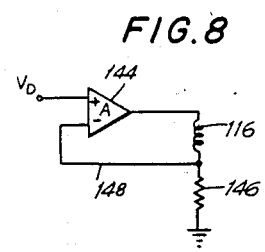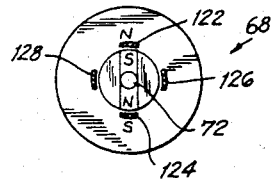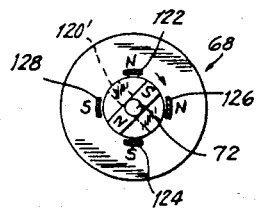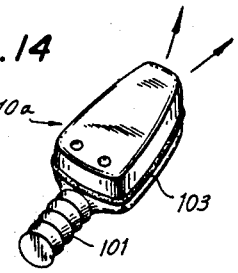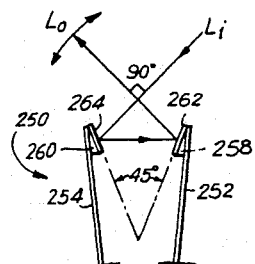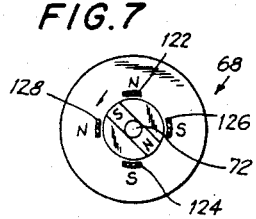

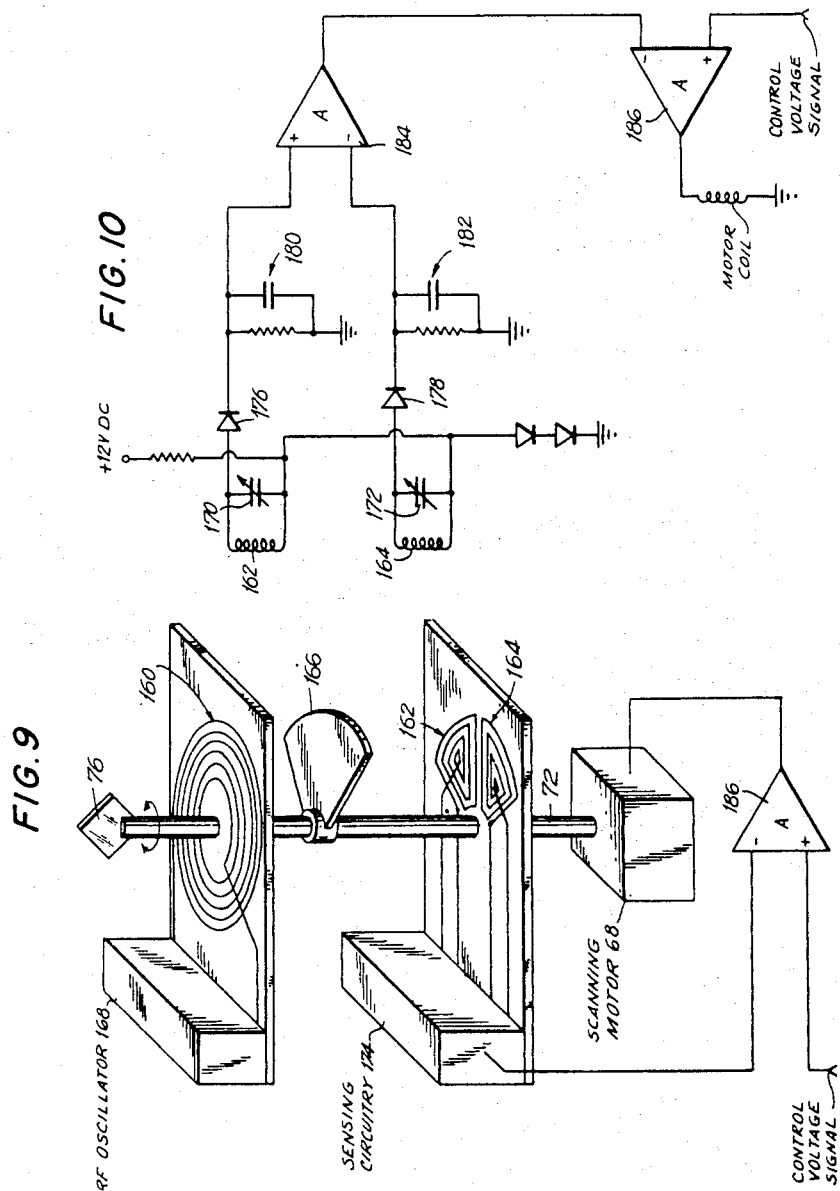

PORTABLE LASER SCANNING SYSTEM AND SCANNING METHODS

CROSS-REFERENCE TO RELATED APPLICATIONS

This application is a continuation of U.S. Ser. No. 378,919 filed May 17, 1982, now abandoned, which, in turn, is a division of U.S. Ser. No. 125,768 filed Feb. 29, 1980, now U.S. Pat. No. 4,389,297.

BACKGROUND OF THE INVENTION

1. Field of the Invention

The present invention generally relates to laser scanning systems for, and methods of, scanning, reading and/or analyzing bar code symbols and, more particularly, to a miniature laser scanning system which is completely field-portable due to its light-weight and small-size and small-volume characteristics. Still more particularly, this invention relates to a hand-held laser scanning head in which the laser source, power component, optics, scanning elements, sensors, and signal processing circuitry are all mounted therein. Yet more particularly, this invention relates to new high-speed scanning elements and their methods of scanning.

2. Description of the Prior Art

Many industries, particularly the grocery and food processing industry, have begun to designate their products with a unique bar code symbol consisting of a series of lines and spaces of varying widths. Various bar code readers and laser scanning systems have been developed to decode the symbol pattern to a multiple digit representation for check-out and inventory purposes.

For example, the contact-type wand or pen bar code readers were manually positioned on the symbol, and then manually dragged across the symbol, with the pen tip always remaining in contact with the symbol. Skilled personnel were generally required to effect the movement, because, among other factors, the angle and pressure of the pen on the symbol was somewhat critical, and the speed of the pen during its manual movement, as well as the uniformity of the pen speed, were also critical.

These contact-type pens were disadvantageous not only because of the requirement for skilled personnel, but also because the pen tip tended to scar the symbol itself. Repetitive manual sweeps were often necessary, because successful decoding may not have occurred on the first attempt. Also, in some applications, a product may need to be scanned several times a day, or repetitively over the years. To protect the symbols, mylar protective coatings were used; however, the mylar coating is not only expensive, but also diffuses the light, thereby resulting in reading problems.

The lack of uniformity of the pen speed also means that the pen readers could not be reliably used as scanner, and particularly not for accurately measuring line widths in symbol analyzers, which measurement requires a uniform scanning speed.

Contact-type pen readers cannot be used with wax-coated products, such as milk cartons, because the was diffuses the light and also adheres to the pen tip, thereby necessitating constant cleaning of the tip.

Nor can contact-type readers be used on soft products, such as soft-packaged potato chips, cheese, or blood bags. The user would have to follow the wrinkles with the pen over these soft packages, and might even rip the package itself.

Nor can contact-type readers be used where the bar code symbol is located on the outer surface of relective aluminum cans; also, contact-type readers cannot be used where the symbol is not located at the outer surface of the packaging. For example, cassette tapes are coded, but the plastic container for the cassette spaces the symbol at a small, but non-negligible, distance from the outer plastic surface of the container across which the pen is dragged. This small distance can cause light diffusion and non-reading.

Some wand or pen readers are of the non-contact type, i.e., the pen tip need not be in physical contact with the symbol. Nevertheless, the depth of focus is not large, and the pen must be positioned in the immediate vicinity of the symbol. For all practical purposes, the non-contact pens are usually manually dragged across the symbol, thereby resulting in the scarring and cleaning problems discussed above.

Moreover, non-contact pens still require criticality in the manipulation of the angle of the pen on the symbol, the pen speed, the pen pressure and the uniformity of pen speed. Most importantly, just like the contact-type pens, the user, at best, gets one scan per manual movement. If the symbol was not successfully read on the first attempt, then the user must repeat the manual scan again and again until a successful decode has been performed. This is time- and labor-consuming.

True laser scanners, not manual readers, are built-into supermarket counters. These point-of-sale of "deck" scanners may be of the moving beam or fixed beam type. However, these are large, massive, stationary installations. Some objects are to heavy, or too big, or too inconvenient to be brought to the stationary scanning installation. Some objects may be stationary themselves.

More modern scanners have recently been designed to have hand-held, portable laser scanning heads. However, the known portable heads weigh over three pounds and are too heave for those assembly-line applications where a user is reading codes all day long. The known portable heads are also somewhat difficult to manipulate easily due to their size, as well as due to the fact that a rather thick and somewhat unwieldly cable interconnects the portable head to a desk-top console which houses the decode circuitry. The cable contains relatively thick, shielded wires and a relatively thick power wire which do not permit a relatively easy freedom of movement as the portable head is manipulated.

SUMMARY OF THE INVENTION

1. Objects of the Invention

Accordingly, it is the general object of the present invention to overcome the aforementioned drawbacks of the prior art.

Another object of the invention is to eliminate the requirement of using skilled personnel to effect a carefully practiced manual scanning movement across a bar code symbol.

Still another object of the invention is to eliminate scarring or tearing of the symbol during scanning.

Yet another object of the invention is to accurately scan a symbol with a high degree of reliability on the first attempt without requiring subsequent scanning attempts.

An additional object of this invention is to provide a completely field-portable and mobile laser scanning system.

A further object of this invention is to provide an entirely field-portable and light-weight laser scanning system in which some of the components thereof are mounted in a hand-held head, and others of the components thereof are mounted in a body harness.

Still another object of this invention is to provide a light-weight laser scanning head of small volume and low weight such that it can be mounted at any desired location on an assembly line without requiring extensive modification to the assembly line.

Another object of this invention is to provide a laser scanning head which is so light-in-weight and small-in-volume that it can be easily held in a user's hand.

Yet another object of this invention is to provide a hand-held, gun-shaped housing which has good balance and a low center of gravity, and is easy to manipulate.

A further object of this invention is to provide a laser scanning head which is shock-resistant.

Still another object of this invention is to reliably scan a symbol using either a generally circular beam spot or a generally rectangular or oval beam spot.

An additional object of this invention is to provide novel high-speed miniature scanning elements and novel scanning methods of operation.

Yet another object of this invention is to conveniently generate single line, multi-line or omni-directional scan patterns with the same scanning elements.

Still another object of this invention is to sense objects bearing the bar code symbols, each in their respective turn.

A further object of this invention is to repetitively scan a symbol a sufficient number of times before attempting to scan another symbol.

An additional object of this invention is to sense the reflected light off the symbol over an expanded field of view.

Yet another object of this invention is to interconnect the laser scanning head and the rest of the scanning system with a flexible, non-bulky cable which is easy to manipulate.

Still another object of this invention is to shut-down the laser source of the laser scanning system after a predetermined time interval has elapsed in which no symbol has been scanned.

Yet another object of this invention is to eliminate frequent shut-down of the laser source of the laser scanning system immediately after a symbol has been scanned.

2. Features of the Invention

In keeping with these objects and others which will become apparent hereinafter, one feature of the invention resides, briefly stated, in a light-weight laser scanning head comprising a housing having wall portions which bound an outlet port and an interior space. A miniature light source means, preferably a laser tube or a semi-conductor laser diode, are mounted within the housing, for generating a laser light beam. Miniature optic means are also mounted within the housing for directing the laser light beam along a light path through the outlet port and towards a bar code symbol which is located in the vicinity of a reference plane that is located exteriorly of the housing. Miniature scanning means, preferably a high-speed scanning motor and/or a penta-bimorph scanning element, are mounted in the light path within the housing for cyclically sweeping the laser beam across the symbol for reflection therefrom. Miniature sensor means, preferably a pair of photodiodes, are mounted within the housing for detecting the intensity of light reflected from the symbol, and for generating an electrical analog signal indicative of the detected intensity of the reflected light. Miniature signal processing means, e.g. analog-to-digital circuitry and envelope detection circuitry, are mounted within the housing for processing the electrical analog signal to generate therefrom data descriptive of the bar code symbol.

In accordance with one feature of this invention, the light source means, optic means, scanning means, sensor means and signal processing means are all mounted within the housing whose volume is less than about 100 cubic inches. Moreover, all the aforementioned means together with the housing weigh less than about two and one-half pounds. The small volume and low weight characteristics of the laser scanning head permit it to be readily mounted at an inspection station of an assembly line without requiring extensive modification to the latter.

Another feature of the invention is embodied in providing a handlebar-type grip on the housing so that the user can conveniently grip the rear end of the housing in his hand and hold the head in the palm of his hand.

In accordance with another feature of this invention, the housing may be shaped in a gun-like configuration having a handle portion mounted below a barrel portion. This feature provides for convenient manual support of the head by the user.

Another feature of the invention resides in mounting the heaviest component within the handle portion so as to provide for a low center of gravity and for an optimum balance design for the head.

Still another feature of the invention is to utilize a multimode laser tube which generates a laser beam characterized by a non-uniform brightness characteristic which varies with time, and to optically modify the latter to produce a beam where the non-uniform brightness effects are much less pronounced over a considerable working distance in the vicinity of the reference plane.

Another feature of the invention is embodied in providing a semiconductor laser diode having a rectangular laser-emitting cavity for generating a laser beam having a rectangular or oval-shaped cross-sectional beam spot. By sweeping the rectangular or oval-shaped spot such that its longer dimension is aligned with the height of the symbol, the laser scanning head possesses better symbol resolution capability.

In accordance with yet another feature of this invention, a new light-weight, high-speed, miniature light beam scanning device is disclosed. This device comprises a scanning motor having an output shaft, and motor control means for driving the scanning motor to reciprocally oscillate the output shaft is alternate circumferential directions over arc lengths which are less than 360°, and typically over arc lengths of about 5°. Light-reflecting means are mounted on the shaft for joint oscillating movement therewith. The light beam which impinges on the light-reflecting means will be rapidly swept across a symbol to be scanned in predetermined cyclical manner.

Still another high-speed, miniature light beam scanning device proposed by this invention, is a penta-bimorph. The penta-bimorph comprises a pair of spaced-apart bimorph elements, and light-reflecting surfaces mounted on each bimorph element and oriented at a 45° angle relative to each other. An incoming light beam which impinges on one of the light-reflecting surfaces will be reflected off the other of the light-reflecting surfaces at a right angle relative to the incoming beam for any undesired motion of the entire penta-bimorph even as the bimorph elements resonate and create the output scan pattern.

Both the scanning motor and the penta-bimorph are high-speed scanners which do not utilize any springs, as is common with galvanometer-type optical scanners. Such springs generally contribute to the large size of the galvanometer-type scanners and, of course, the scanning elements of this invention to not comprise any such springs, nor are they faced with the possibility of any such springs wearing out through prolonged use.

Another feature of the invention resides in a completely field-portable and mobile laser scanning system which comprises a hand-held laser scanning head, a body-support harness, and a non-bulky connecting cable connected between the harness and the head. The connecting cable readily accommodates itself to span the everchanging distance between the harness and the head as the latter is moved from one symbol to another. Inasmuch as the signal processing means converts the generated analog signal to a digital signal in the head, only digital signals are required to be conducted along the connecting cable. Such digital signals do not require radio frequency shielding and hence, the individual wires are much thinner and more flexible as compared to the prior art connecting cables. Furthermore, it is no longer necessary to bring high voltage to the head by means of a thick power wire. This likewise contributes to the bendability of the connecting cable.

Another important feature of this invention is the capability of sensing objects, each in their respective turn. It is critical to distinguish between whether many scans have been performed for one object, or whether one scan has been performed for many objects. When a user approaches an object bearing a symbol, he manually actuates a trigger to initiate repetitive scanning of the symbol. Once the decode circuitry has determined that a sufficient number of scans have been performed to successfully decode the symbol, then the user is alerted, typically by an indicator, such as a light-emitting diode and/or a beeper, that the repetitive scanning of the object has been terminated. The trigger can be released either prior to, or after, the indicator is actuated. The actuation of the trigger and the indicator are separate defineable events in which only a single object has been repetitively scanned for a determine number of times.

Another feature of the invention is based on safety considerations. In some prior art systems, the laser tube itself is shut down after each scanning of a symbol in order to prolong the laser working lifetime. In other applications, a mechanical shutter is placed in the path of the laser beam. Those mechanical shutters are generally run by solenoids which wear out over time, and which require a lot of drive power.

In contradistinction to those prior art safety techniques, the present invention proposes to place a laser-reflecting means associated with the scanning means in the light path of the laser beam, and thereupon to move the laser-reflecting means to shutter position. In accordance with this feature, transmission of the laser beam through the outlet port is prevented without separately deactuating the laser tube and without using a solenoid-operated mechanical shutter assembly.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side sectional view of a gun-shaped embodiment of a laser tube-based laser scanning head in accordance with this invention;

FIG. 2 is a top sectional view of the gun-shaped embodiment of FIG. 1;

FIG. 3 is a front view of the gun-shaped embodiment of FIG. 1;

FIG. 4 is a side sectional view of a miniature high-speed scanning motor with schematically-illustrated control circuitry in accordance with this invention;

FIG. 5 is a diagrammatic view of the motor of FIG. 4 with the rotor in its equilibrium position;

FIG. 6 is analogous to FIG. 5, but showing the rotor in one of its sweep-limiting positions in solid lines, and its shutter position in dashed lines;

FIG. 7 is analogous to FIG. 5, but showing the rotor in the other of its sweep-limiting positions;

FIG. 8 is a feedback circuit for modifying the output shaft speed motor of FIG. 4;

FIG. 9 is a closed loop scanning motor control circuit for the motor of FIG. 4 in accordance with this invention;

FIG. 10 is an electrical schematic of the motor control circuit of FIG. 9;

FIG. 11 is a schematic view of a completely field-portable and mobile laser scanning system utilizing the FIG. 1 gun-shaped embodiment of a laser scanning head in accordance with this invention;

FIG. 12 is a schematic view of a semiconductor laser diode-based embodiment of the portable laser gun scanning head in accordance with this invention;

FIG. 13 is a diagrammatic view of an assembly line equipped with a box-shaped, bracket-mounted embodiment of a laser scanner head serving as an inspection station in accordance with this invention;

FIG. 14 is a schematic view of another hand-held embodiment of a laser scanning head in accordance with this invention;

FIG. 15 is a diagrammatic view of a penta-bimorph scanning element with schematically-illustrated drive circuitry in accordance with this invention; and FIG. 16 is an electrical circuit diagram of the control circuitry in accordance with this invention.

DETAILED DESCRIPTION OF THE PREFERRED EMBODIMENTS

I. LASER TUBE SCANNER

Referring now to FIGS. 1-3 and 11 of the drawings, reference numeral 10 generally identifies a light-weight, hand-held, portable laser scanning head for use in a laser scanning system operative for reading and/or analyzing bar code symbols. Such symbols comprise a series of lines and spaces of varying widths, which pattern decodes to a multiple digit representation characteristic of the product bearing the symbol. Typical symbol bar codes in current use are the Universal Product Code (UPC), EAN, Codabar and Code 39.

Turning again to FIG. 1, the portable laser scanning head 10 includes a generally gun-shaped housing having a handle portion 12 and a barrel portion 14. The handle portion 12 has a cross-sectional dimension and overall size such that it can conveniently fit in the palm of a user's hand. The barrel portion 14 is connected to the handle portion 14 at detachable connectors 16,18.

Both the handle and barrel portions are constituted of a light-weight, resilient, shock-resistant, self-supporting material, such as a synthetic plastic material. The plastic housing is preferably injection-molded, but can be vacuum-formed or blow-molded to form a thin shell which is hollow and bounds an interior space whose volume measures less than a value which is on the order of 100 cubic inches. The specific value of 100 cubic inches is not intended to be self-limiting; it has been provided merely to give an approximation of the overall maximum volume and size of the head 10. The overall volume can be much lower than 100 cubic inches, and indeed, in some applications, interior volumes on the order of 50 cubic inches are obtainable.

The barrel portion 14 is generally horizontally elongated and has opposite end regions 20,22. The handle portion 12 is elongated and is connected to the barrel portion such that the handle portion forms an angle with the latter. The detachable connectors 16,18 mount the handle portion below the barrel portion and intermediate the opposite end regions 20,22 of the latter. This feature permits the user to conveniently manually support the head 10 from below the barrel portion and at a location for optimum manual manipulation and balance of the head.

Miniature light source means for generating a laser light beam is mounted in the interior space of the barrel portion 14. In one preferred embodiment, the light source is a co-axial helium-neon laser tube 24 which generates a red-light beam at a wavelength of 632.8 nanometers. The laser tube is a hard-sealed, unpackaged tube. The laser tube is of light-weight (i.e., less than six ounces; typically on the order of three ounces); is of short length (i.e., less than eight inches; typically on the order of five inches); has a low input DC power requirement (i.e., anode voltage less than 1100 volts, typically about 650 volts; anode current less than 4.5 milliamps, typically about 4 milliamps); has a low firing voltage (i.e., less than six kilovolts, typically about 3.4 kilovolts maximum); has a low output power (i.e., on the order of 0.5 milliwatts); and is long-lasting (i.e., on the order of 15,000 hours).

The laser tube 24 produces a light beam in the $TEM_{nmq}$ mode. This multi-mode tube generates a laser light beam having an axial cross-sectional, generally circular, beam spot in the immediate vicinity of the anode 26 which is about 35 mils in diameter. It will be understood that the laser light beam diverges in direction away from the anode 26 at an angle of divergence at about 3.5 to 4 milliradians. In contrast to conventional signal mode laser tubes whose output beam circular spots characterized by a gaussian brightness distribution characteristic which does not vary over time, the circular beam spot of the multi-mode laser tube 24 is characterized by a non-uniform brightness characteristic which varies with time. Visual observation of the output beam spot of the multi-mode tube is characterized by darker zones within the output beam spot, which darker zones move randomly within the output beam spot in a manner roughly analogous to sunspot activity.

Straps 32,34 having springs at their respective ends are wrapped around the tube 24 for mounting the latter on a motherboard or support plate 30. Rubber bumpers 36,38 are used to mount the support plate in shock-resistant relationship with the barrel portion. Specifically, bumper 36 is mounted between the housing and a front vertical flange portion 40 of the plate 30 in order to minimize to-and-fro horizontal movement of the plate and its associated components mounted thereon. Bumper 38 is mounted between the housing and a rearward horizontal portion of the plate 30 in order to minimize up-and-down vertical movement of the plate and its associated components.

The underside of the laser tube 24 which faces the plate 30 is received in a pair of spaced-apart grooved supports 42,44. Each support 42,44 has a threaded adjustment element which is threadedly mounted on the support plate 30. The threaded elements 46,48 are independently turnable to adjust the position of the laser tube relative to the support and, in particular, to properly align the laser light beam with respect to the miniature optic means, as described below.

The DC power supply 50 for supplying DC power to the laser tube 24 is mounted within the interior space of the handle portion 12. The DC power component 50 occupies a volume of about four cubic inches and weighs about six ounces. This power component is the heaviest component from among all the other components mounted within the housing, and therefore, the placement of this heaviest component within the handle portion provides the head with a low center of gravity and better balance for ease of manipulation.

As best shown in FIG. 16, the power supply 50 has an input terminal 52 to which low DC voltage, e.g. 12 VDC, is applied. The 12 volts DC is supplied by a separate non-shielded wire conductor which is located within connecting cable 58. The supply 50 also has an output terminal 54 which supplies the appropriate anode voltage and anode current to the anode 26 of the laser tube 24 via a ballast resistor 55. The ballast resistor 55 is about 100 kilohms, 2 watts. The cathode 28 of the tube 24 is grounded.

The supply 50 further includes a control terminal 56 which is operatively connected to a trigger switch 60 and to a control circuit, as described in detail below. The presence or absence of a control signal at the control terminal 56 determines whether or not the anode voltage is generated at the output terminal 54. The electrical connections for the various terminals 52, 54,56 have been omitted from FIG. 1 for the sake of clarity.

Turning again to FIG. 1, the laser light beam is directed to miniature optic means which is also mounted in the barrel portion. The optic means includes an optical train operative for optically modifying the laser light beam, and for directing the modified beam along a light path through the housing. The beam exits the housing through an outlet port 62 located at end region 20, and impinges on a bar code symbol which is located in the vicinity of a reference plane that is located exteriorly of the housing.

The optical train includes a beam expanding negative lens 64 and an objective position lens 66 each having individual f numbers which are typically in the range from f/6 to f/7. The f number for the beam exiting the optical train is typically in the f/50 to f/60 range. Other choices of lens parameters can lead to larger numbers for the depth of focus in the range from 1" or more for the multi-mode laser.

As noted above, the beam spot diameter immediately outside the laser tube is about 35 mils. The beam expanding lens 46 increases the beam spot diameter to about 250 mils at the objective lens 66. The optical train will focus the beam such that the beam spot will have a diameter on the order of from 5 to 7 mils at the reference plane which is about 260 mm away from the objective lens 66. The 6 mil spot size at the reference plane is maintained on both sides of the latter over a working distance. In a preferred embodiment, the reference plane is spaced about 1 inch away from the end region 20 of the barrel portion 14, and the working distance is about 2 inches. Hence, the 6 mil spot size is generally maintained from the end region 20 for a distance of 1 inch to the reference plane, and also beyond the latter for an additional 1 inch. A bar code symbol placed anywhere in this region will be accurately decoded and/or analyzed.

The focal lengths and distances of the positive and negative lenses of the optical train are specially designed to modify the multi-mode laser beam. The beam spot at the reference plane still contains dark zones, but the uneven brightness characteristic is less pronounced.

The optics for a single mode laser tube are more conventional then for the multi-mode case, and f numbers for lenses would typically lie in the range from f/120 to f/200 to obtain depths of focus in the range from 2" to 3". For the multi-mode case, the f numbers for the lenses are lower, thereby mandating a smaller depth of focus on the order of 1". However, we have found that the working distance can be greater than 1", and typically in the neighborhood of 2".

The preferred embodiment of the positive lens 66 for minimum spot size is an infinity-corrected achrometric doublet, wherein the spot size will be increased only about 5% over the diffracton condition. If a single plano-convex singlet is used, as illustrated, the spot size will be increased by about on the order of 40%.

Miniature scanning means are mounted in the light path in the interior space of the barrel portion for cyclically sweeping the laser beam across the bar code symbol for reflection therefrom. The scanning means comprises at least one miniature scan means 68 for sweeping the symbol along a predetermined direction (X-axis scanning) lengthwise thereof. The scanning means may, but not necessarily, comprise another miniature scan means 70 for sweeping the symbol along a transverse direction (Y-axis scanning) which is substantially orthogonal to the predetermined direction.

Many types of scan elements can be utilized for either scan means 68,70. For example, miniature polygons driven by motor scans be used, or the various bimorph scanning oscillating elements described in co-pending U.S. patent application Ser. No. 911,171, filed May 31, 1978, now U.S. Pat. No. 4,251,798.

Nevertheless, the X-axis scan means 68 and the Y-axis scan means 70, as described in detail below, are particularly compatible in terms of their size and weight to be mounted within the barrel portion 14. The operation of these scan means 68,70 will be discussed below in connection with FIGS 4-10. At this stage of the discussion, it is sufficient to understand that both scan means 68,70 are scanning motors which have reciprocally oscillating output shafts 72,74. Light-reflecting means or mirrors 76,78 are respectively mounted on shafts 72,74 and positioned in the light path. Motor control means are operative for driving each motor to reciprocally turn each shaft in a predetermined cyclical manner in alternate circumferential directions over arc lengths which are less than 360°. Typically, the arc lengths will be about 5° relative to the vertical. Of course, other arc lengths could also be utilized. Any light beam impinging on the mirrors will be moved at a very rapid rate of speed which is at least on the order of five oscillations per second, and typically about 100 oscillations per second.

The miniature scanning means includes a stationary light-reflecting mirror 80 which is fixedly mounted on the support plate and which is positioned at a 45° angle relative to the axis about which the output shaft 72 turns. The light beam leaving the objective lens 66 impinges on the stationary mirror 80, and is thereupon reflected in a horizontal plane to impinge on the mirror 76 which, in turn, is mounted on the shaft 72 and is positioned at a 45° angle relative to the turning axes of shafts 72,74. The light impinging on mirror 76 is reflected upwardly to mirror 78 which is mounted on the shaft 74 at a 45° angle. The light impinging on mirror 78 is thereupon reflected forwardly in lengthwise direction along the barrel portion 14. The light beam passes through the laser beam-transmissive exit window 62.

The reciprocal oscillation of the shaft 72 causes the light beam to be moved lengthwise along the bar code symbol to thereby obtain X-axis scanning. If desired, the reciprocal oscillation of the shaft 74 causes the light beam to be moved along the height of the symbol to thereby obtain Y-axis scanning.

If only the X-axis scanning motor 68 is driven such that mirror 76 is driven at a uniform rate of speed, then the laser beam will be linearly displaced in horizontal direction, and a generally linear scan line will be generated at the reference plane. If the Y-axis scanning motor 70 is likewise driven such that mirror 78 is driven at a uniform rate of speed, then the laser beam will be linearly displaced in vertical direction, and a raster-type scan pattern will be generated at the reference plane. The scan pattern comprises a set of generally parallel, equidistantly spaced-apart scan lines which are stacked one about another along the vertical direction.

Other types of scan patterns are also available. For example, if the Y- and X-axis scanning motors ae both driven such that mirrors 76,78 are driven at a sinusoidally-varying rate of speed, than the scan pattern at the reference plane will be a Lissajous-type pattern for omni-directional scanning of UPC symbols.

The barrel portion 14 has an upper wall portion 82 and a lower tapered wall portion 84 respective located above and below the output port at the end region 20. The upper wall portion 82 is generally planar and has no upstanding projections mounted thereon in the vicinity of the end region 20. The outlet port is dimensioned to be wide and narrow. The laser beam exits the outlet port at a location just below the upper wall portion. Hence, the upper wall portion 82 serves as a convenient sighting guide in which to accurately aim the laser light beam towards the target symbol. It will be recognized that a user generally sights the target symbol from a position generally behind the head 10, and that therefore, an upper wall portion 82 having projections would block his view. The smooth upper wall portion 82 described above avoids visual interference between the housing and the laser beam itself.

Miniature sensor means are likewise mounted on the front upright flange 40 of the support plate 30 in the interior space of the housing. The miniature sensing means includes a photo-sensor device such a photomultiplier tube or a semiconductor photodiode, for detecting the intensity of the light reflected from the symbol, and for generating an analog electrical signal indicative of the detected intensity of the reflected light.

As shown in FIG. 1, the reflected light first passes through the exit window 62, and thereupon passes through the red-light laser beam-transmissive filter 90, whereupon it impinges on a pair of photodiodes 86,88. The photodiodes are mounted in spaced-apart relationship on the flange 40, and generate an analog electrical signal. Two diodes are used, rather than one, in order to increase the field of view. The two diodes are spaced apart such that their individual zones of coverage overlap each other. If the field of view of scanning means is on the order of four inches, then the photodiodes are spaced about two inches apart for complete zone coverage.

Miniature signal processing means 92 (see FIG. 2) are also mounted in the interior space of the barrel portion 14 for processing the electrical signal generated from the sensor means. The processing means is fixedly mounted on the support plate 30 at one side of the laser tube 24. The processing means is preferably fabricated as an integrated circuit which processes the electrical analog signal and digitizes it to generate data descriptive of the bar code symbol. Reference may be had to co-pending application Ser. No. 911,171, filed May 31, 1978, now U.S. Pat. No. 4,251,798 for details of one preferred type of signal processing means.

The control circuitry 94 (see FIG. 2) for the scanning means 68,70 is likewise preferably fabricated as an integrated circuit and is mounted on the other side of the laser tube. All of the electrical connections for the photodiodes 86,88, the processing means 92, and the control circuitry 94 for the scanning means 68,70 have been omitted from FIGS. 1-3 for the sake of clarity. A detailed description of the control circuitry is set forth below in connection with FIG. 16.

All of the above components, including, among others, the laser tube 24; the power supply component 50; the lenses 64,66; the scanning motors 68,70; the photodiodes 86,88; the processing circuitry 92; the control circuitry 94; and the support plate 30 together with the handle portion 12 and the barrel portion 14 of the housing comprise a light-weight scanning head whose total weight measures less than a value which is on the order of two and one-half pounds. The specific two and one-half pound weight figure is only exemplary, and is not intended to be self-limiting. Typically, weights on the order of one to two pounds are readily obtainable and, in the semiconductor laser diode embodiment described below, weights on the order of less than one pound are realized.

The portable head 10 depicted in FIGS. 1-3 and 11 is a hand-held unit, and flexible non-bulky cable 58 interconnects the head 10 to the remaining components of the laser scanning system. These remaining components include, among others, the digital signal decode computer circuitry, the data storage circuitry, and, in some applications, the control voltages for the power supply 50 and for the control circuitry 94. These additional circuitry components can be mounted in a desk-top console for AC wall power operation, or in the preferred embodiment of FIG. 11, they can be incorporated into a body harness 100 to be worn by the user. In this latter case, a rechargeable battery pack is mounted on the harness for complete field-portability of the entire system.

The body harness 100 can be a back-pack or preferably a belt-pack (see FIG. 11) which is worn about the user's waist. The decode computer circuitry 102 is mounted on the belt-pack, and is operative to decode the digitized signals generated by the signal processing means 92. The data storage circuitry 104 is also mounted on the belt-pack, and is operative to store the decoded signals. Essentially, the data storage circuitry 104 is a self-contained memory device, such as non-volatile bubble memory means, or magnetic cassette, or volatile semiconductor read/write memory means. The low voltage rechargeable battery supply 106 is likewise mounted on the belt-pack. The decode circuitry 102, data storage circuitry 104 and battery 106 can be separately mounted on the belt 100, or can all be mounted within a single housing roughly measuring about $2''\times 4''\times 10''$. The entire laser scanning system is completely field-portable and self-contained.

It is also within the spirit of this invention to miniaturize the additional components mounted on the belt-pack 100, particularly by large scale integration of the decode computer circuitry into from one to three chips, and to mount these addititional components into the housing of the parallel head 10 itself. In that case, the entire laser scanning system can be held in the user's hand.

The cable 58 comprises a plurality of radio-frequency non-shielded wires therein. Some of these wires conduct the input voltage to the input terminal 52 of the power supply 50, as well as biasing voltages for the control circuitry. Another wire conducts the digitized signals from the processing circuitry 92 to the belt-pack 100. Still another wire conducts an indicator signal to the light-emitting diode 99 and/or the auditory beeper 98 to indicate, either visually or by sound, that the symbol has been successfully decoded.

All of the aforementioned non-illustrated individual wires are unshielded. This means that the cable 58 is relatively small in cross-section, light-in-weight, non-bulky, and flexible, and therefore is easily moved when the head 10 is aimed at different target symbols. The cable 58 is characterized by multiple freedoms of movement and does not require excessive strength on the user's part for manipulation purposes.

The head 10 need not have the gun-shaped configuration as depicted in FIGS. 1-3 and 11. Other configurations such as streamlined or box-like configurations are also contemplated. For example, another hand-held configuration for the head 10a is shown in FIG. 14. The streamlined head 10a is basically identical to the gun-shaped head, except that the handle portion 12 is co-liner with the barrel portion, and that the rear end of the barrel portion 14 has finger-receiving grooves 101 resembling a handlebar-type grip. The user can thus grip the head and hold it in the palm of his hand.

Another feature of the streamlined head 10a is an external rubber bumper 103 which could be utilized for any of the housings disclosed herein. As noted above, like any hand-held equipment, a hand-held laser scanner head must be strong enough to withstand some physical abuse, such as being unintentionally pushed off a table onto the floor. Hence, the rubber shock mounts 36,38 are used to support the rigid plate 30 within the housing in such a way as to allow the plate and the components mounted thereon to momentarily shift within the housing under shock loading. Sufficient clearance is provided around the plate 30 to allow it to move without hitting the inside wall of the housing. After the shock has passed, the rubber shock mounts will return the inner structure to its original position within the housing.

Shock absorbtion is also performed by flexing of the resilient outer housing wall itself. Constructing the outer housing out of suitable material such as vacuum-formed ABS can permit this flexing with no damage occurring to the housing.

Still further shock absorbtion is obtained by the rubber bumper or ridge 103 running around the outside of the housing and positioned so as to absorb the most common shocks such as dropping the scanner on its side on a table. The housing is molded in two parts, and the ridge 103 is placed between the two housing parts.

As another example, the miniature size, small volume, and light-weight characteristic of the head 10 make it suitable not only for hand-held applications, but also for conveniently converting any designated location on a production line to an inspection station or to any on-line symbol affixing station. As best shown in FIG. 13, the box-shaped head 10b is provided with a bracket 11 for stationarily mounting the head 10b at any designated location on the assembly line 13. A plurality of objects 15 are conveyed past the head 10 for inspection purposes. The head 10b can also be conveniently mounted on a support stand.

The miniature size and light weight parameters insure that extensive modification to the production line facility 13 is not required. In view of the fact that the inspection station is stationary, it is not necessary to mount the DC power supply component 50 within the head 10. Instead, the DC power supply component 50 can be mounted at another location remote from the interior space of the housing, thereby obviating the need for providing a handle as in the gun-shaped version.

II. HIGH-SPEED SCANNING MOTOR

The structural and functional details of the X-axis scanning motor 68 are illustrated in FIGS. 4–10. These details are identical for Y-axis scanning motor 70, and hence will not be repeated for the sake of brevity.

The scanning motor 68 is a light-weight, miniature laser light beam scanning device for the high-speed scanning of bar code symbols in laser scanning systems. The motor 68 includes an oscillatory output shaft 72 which is journalled in bearing 108; and a mirror 76 fixedly mounted on the shaft 72 for participating in the joint oscillatory movement therewith.

The motor 68 includes an upper cup-shaped stator housing 110 and a lower cup-shaped stator housing 112. Stator coil windings 114, 116 are respectively mounted in stator housings 110, 112. A permanent magnet rotor 120 is journalled on stub shaft 118 which is co-linearly arranged with shaft 72. The rotor 120 is surrounded by the stator coils, and is operatively connected to the output shaft 72 for joint oscillatory movement therewith.

The upper stator housing 110 has a pair of poles 122,124 mechanically displaced by 180°. The low stator housing 112 has a pair of poles 126,128 mechanically displaced by 180°. The upper poles 122,124 are spaced 90° apart from the lower poles 126,128. The permanent magnet rotor 120 is magnetized with the same number of pole pairs (i.e., one pair) as contained by each stator coil winding.

The structural aspects of the scanning motor 68 are analogous to a simplified stepper motor, which is a device which is used to convert electrical pulses into discrete mechanical angular movements every time the polarity of a stator winding is changed. By alternately energizing and de-energizing the two stator coils of a stepper motor, the magnetic interaction between the rotor poles and the stator poles causes the rotor to turn in discrete angular steps over the entire 360° circumference of the output shaft.

In contradistinction to stepper motors, the motor control means 94 is operative to oscillate the shaft 72, first in one circumferential direction over an arc length less than 360°, and secondly in the opposite circumferential direction over an arc length less than 360°, and thereupon to repeat the aforementioned cycle at a high rate of speed. Each arc length is typically about 5° relative to the vertical, although other angular displacements are possible. The rate of oscillation is typically on the order of one hundred cycles per second.

The motor control means 94 includes reference means 140 for applying a generally constant low level DC voltage to one of the stator windings. For example, a 12 v DC signal is applied to stator winding 114 via conductor 132. The motor control means also includes variable means 142 for applying a periodic voltage of time-varying amplitude to the other of the stator windings. For example, a triangular voltage waveform is applied to stator winding 116 via conductor 134.

In FIGS. 5, 6 and 7, the reference means applies a constant positive DC voltage to stator coil 114, thereby energizing stator poles 122,124 as north and south, respectively. In FIG. 5, the variable means applies a zero voltage to stator coil 116, thereby permitting the permanent north and south poles of the rotor to align themselves with stator poles 122,124, as shown. In FIG. 6, the variable means applies a positive DC voltage to coil 116, thereby energizing stator poles 126 and 128 as north and south respectively, and concomitantly causing the rotor to turn in clockwise direction to an angular position which is dependent upon the positive amplitude of the voltage applies to coil 116. In FIG. 7, the variable means applies a negative DC voltage to coil 116, thereby energizing stator poles 126 and 128 as south and north, respectively, and concomitantly causing the rotor to turn in counterclockwise direction to an angular position which is dependent upon the negative amplitude of the voltage applied to coil 116.

In summary, the shaft 72 is moved in an analog manner to an angular position which corresponds to the amplitude of the periodic voltage. The number of degrees of angular movement is proportional to the voltage amplitude. The speed of movement of the shaft 72 corresponds to the rate of change of the periodic voltage. The direction of movement, i.e. clockwise or counterclockwise, is dependent upon the slope, i.e. positive or negative, of the periodic voltage. The oscillation rate is proportional to the periodicity of the periodic waveform. The rate of oscillation is at least five oscillations per second, and in a preferred embodiment, the rate is on the order of one hundred cycles per second.

The periodic voltage waveform can be any time-varying voltage, such as a sawtooth, sinusoidal or triangular waveform. For periodic drive waveforms, the speed of the shaft is non-linear, and in fact, is sinusoidal-like in the sense that the shaft speed slows down when the shaft approaches the sweep-limiting positions of FIGS. 6 and 7, and speeds up when the shaft approaches the equilibrium position of FIG. 5.

In order to obtain more linear tracking of the shaft position with respect to the amplitude of the periodic drive voltage, one adjustment is to pre-set the amplitude of the constant DC voltage which is applied to stator coil 114 by adjusting the reference means 140 to a pre-determined value. All oscillatory components can be characterized by a resonant frequency. For the scanning motor 68, the resonant frequency is determined, among other things, by the mass of the moving structure and by the fixed magnetic field (i.e., spring constant) which is established by the stator windings. Hence, by changing the DC voltage level applied to stator coil 114, one adjusts the frequency of movement of the shaft to any desired value.

If the reference means 140 is adjusted such that the frequency of movement is at or near the inherent resonant frequency, then a large amplitude of motion for the shaft is obtained for a relatively small input power. This adjustment is used for those applications where a minimum power drain is desired, typically in battery-powered operation.

On the other hand, if the reference means 140 is adjusted such that the frequency of movement is remote from the resonant frequency, then more linear tracking of shaft position versus drive voltage amplitude is obtained at the expense of input power. This adjustment is useful for those applications where a more linear sweep is desired; for example, for measuring bar code widths.

Another method of obtaining more linear tracking is to widen the sweep by over-driving the shaft 72 to sweep-limiting positions which are more angularly spaced apart to sweep a field of view which is more than necessary to scan the symbol. We have recognized that the shaft undergoing a sinusoidal-like movement undergoes a somewhat linear movement over a central portion of its overall movement. Analysis of the harmonically-varying angular velocity reveals that the linear spot velocity of the beam spot on the scan surface is relatively constant over a much larger portion than normally expected. Perhaps twice as much of the duty cycle portion of the harmonic motion is useable. The linear spot velocity of the harmonically-varying angular velocity can be described as a complex transcendental function, and has a velocity which is uniform to within a few percent over a ±25° to 30° range.

Hence, in the vicinity of the equilibrium position, the shaft undergoes a somewhat linear movement. By over-driving the shaft 72 to generate a sweep having a field of view on the order of eight inches, in a situation where only a four inch sweep is required to adequately scan a symbol, the speed of the shaft 72 is essentially linear over the central three and one-half to four inches of sweep.

Still another method of obtaining more linear tracking is to utilize the feedback circuitry depicted in FIG. 8. The drive waveform $V_D$ is applied to the positive input terminal of the differential amplifier 144. The amplifier output is connected to one end of the stator coil winding 116. The voltage at the opposite end of the coil 116 is connected to ground via resistor 146, and is fed back to the negative input terminal to the amplifier 144 via feedback conductor 148. The voltage in the feedback conductor 148 is the attenuated drive voltage which is superimposed with the voltage generated by the stator coil due to shaft motion. The voltage in the feedback conductor 148 attempts to follow the drive voltage, thereby making the output shaft speed more uniform.

Any laser light impinging on the mirror 76 will therefore be linearly swept across the target symbol. If two scanning motors are used, then the laser beam can be swept over two mutually orthogonal directions to generate raster-type scan patterns. Of course, if omni-directional scan patterns, such as Lissajous-type patterns, are required for some applications, then the above-described linear tracking techniques are not utilized. The unmodified sinusoidal-like movement of the output shaft then represents a significant feature of the scanning motor element.

The miniature scanning motor weighs about one ounce, and occupies a volume on the order of one inch ×0.4 inches. The scanning motor also has a long working-lifetime on the order of 10,000 hours, because it is frequently shut down, as described below.

Yet another method of obtaining more linear tracking is illustrated by the closed loop scanning motor control circuit depicted in FIGS. 9 and 10. The scanning motor control circuit includes the scanning motor 68 operative for reciprocally oscillating the shaft 72 first in one direction, and then the other, with angular motion of always less than 360°, as described above. The mirror 76 is mounted at the end of the shaft 72 to reflect a light beam in a desired predetermined manner.

The control circuit comprises a primary coil 160, two or more secondary coils 162 and 164, and a movable shield 166. The primary coil 160 is energized by a radio frequency oscillator 168. The secondary coils 162,164 are juxtaposed physically closed to the primary coil 160. The shield 166 is fixedly mounted on motor shaft 72 for joint oscillatory movement therewith, and is located between the primary coil 160 and the two secondary coils 162,164.

As best shown in FIG. 10, the tuning capacitors 170,172 tune the secondary coils to resonate at the frequency at which the primary coil is excited. When the primary coil is excited, the secondary coils are inductively coupled to it to establish an oscillating magnetic field, and an AC voltage of the same high oscillating frequency as the primary coil appears across the secondary coils, and is detected by the sensing circuitry 174.

The shield 166 modifies the radio frequency signal at the primary coil which is coupled to the secondary coils by an amount proportional to the area of the latter covered by the shield. As the shaft 72 oscillates, the shield moves relative to the magnetic field, the voltage across one secondary coil increases as that secondary coil becomes unshielded, and concomitantly the voltage across the other secondary coil decreases as it becomes more shielded.

The voltage sensing circuitry 174 comprises peak diode detector sub-circuits which include diodes 176,178 and resistor-capacitor parallel-combinations 180,182. Each detector sub-circuit detects the voltage on its respectively associated secondary coil, and feeds the voltages to a differential amplifier 184 for generating a difference signal which is proportional to the angular displacement of the shaft 72. This difference signal is, in turn, fed to one input of another differential amplifier 186, whose other input is supplied with a control voltage. The output drive signal is fed to the stator coil.

In a preferred embodiment, the primary coil with its oscillator is printed on a printed circuit board. The primary coil is printed with a circular pattern, and the shaft 72 extends through the center of the primary coil. The secondary coils are printed with their sensing circuitry on another printed circuit board. The secondary coils are printed as generally triangular patterns with the apex located on the shaft axis.

Referring now to FIG. 16, each miniature scanning motor 68,70 is provided with a reference means 140 and a variable voltage means 142. In addition, shutter means 150 are provided in the control circuitry 94 for generating a shutter voltage which moves either or both output shafts of the motors 68,70 to a shutter position in which the associated mirrors are moved such that the laser beam is prevented from passing through the outlet port 62 towards the symbol.

The shutter means 150 is electrically connected to the variable voltage means. In one embodiment, the shutter means 150 generates a voltage having an amplitude greater than the amplitude of the drive voltage. In FIG. 6, the dashed line representation of the rotor 120' depicts the shutter position. The large amplitude voltage displaces the output shaft to a greater angular extent than that required by the sweep-limiting position shown in solid lines. In this case, the associated mirror is moved out of the light path, to thereby interrupt laser beam transmission.

In another preferred embodiment, the shutter means is not operative to move the mirror out of the sweep range, as described above. Instead, the shutter means is operative to move the mirror to a position within the sweep range such that the reflected light will not pass through the outlet port. The reflected light can be contained within the housing itself, or preferably can be diverted to a light absorber, such as a black body, mounted within the housing.

In the preferred embodiment, the variable voltage means moves the mirror such that the reflected laser light beam is swept across a field of view which is longer than the length of the exit window at the outlet port 62. In effect, the housing walls at opposite sides of the exit window intercept the laser light beam and block its transmission when the beam is swept through its entire sweep range beyond the length dimension of the exit window. In this case, the shutter position can be any position of the mirror which results in its reflected light being directed beyond the length dimension of the exit window. It will be noted that the shutter position in this case is within the entire sweep range but is still such that the laser light beam is prevented from reaching the symbol.

The shutter position represents a motor shut-off condition. The frequent motor shut-downs described below means a very low duty cycle.

III. OBJECT SENSING

As described above, the scanning means is operative to rapidly and repetitively scan the target symbol. For proper operation, it is necessary to distinguish between whether many scans have been performed for one object, or whether one scan has been performed for many objects. The capability of sensing each object to be scanned in its turn is critical for successful decoding.

Trigger means 60 (see FIGS. 1 and 10) is operative for actuating the scanning means 68,70 to repetitively sweep the bar code symbol a number of times each time the trigger means 60 is actuated. Trigger means 60 is preferably a manually-depressable switch mounted on the housing in the vicinity of the interconnection of the barrel and handle portions of the housing. The trigger switch 60 is located on the handle portion such that the forefinger of the user's hand can be used to manually depress the switch. Each time the switch is depressed, the scanning means sweeps the symbol many times, on the order of two hundred times.

When the decode circuitry 102 successfully decodes the symbol, which may occur on the first scan or at any scan up to and including the two hundredth scan, the decode circuitry generates a successful decode signal and conducts the latter through a conductor in the cable 58 to actuate the indicator means located in the head. The indicator means comprises an auditory-type beeper 98 and/or a light-emitting diode 99. When the beeper 98 sounds and/or when the diode 99 lights up, then the user knows that the scanning for that particular symbol has been terminated. The actuation of the switch 60 and the actuation of the indicator means are definable events which advises the laser scanning system when scanning begins and ends. The trigger 60 may be released either before or after actuation of the indicator means.

When scanning ends, upon indication of the indicator means, the mechanical shutter circuitry 150 moves the output shafts to their shutter positions, thereby preventing further laser beam transmission out through the outlet port. The laser tube 24 is not shut off at this time; only the scanning motor is shut down. This not only represents a safety feature, but also lengthens the working-lifetime of the laser tube and of the scanning motors.

Actuation of the trigger means 60 concomitantly turns the laser tube 24 on, provided that the laser tube was previously shut-down. Moreover, actuation of the trigger means 60 simultaneously turns timer means 152 on. The timer means 152 remains operative for a predetermined time period, on the order of five minutes. If the trigger switch 60 is not actuated during the five minute timing period, then the laser tube is automatically shut down by sending a control signal to the control terminal 56 of the power supply component 50. This conserves power. If the trigger switch is pulled during the timing period, then the timing period is reactivated, and the laser tube has another five minutes to wait before it is automatically shut-down in the event that the trigger switch is not depressed again in the next five minutes. Another light-emitting diode 97 (see FIG. 1) is mounted on the head to indicate the on-off status of the laser at all times.

As noted above, each actuation of the trigger means 60 initiates a plurality of scans until the decode circuitry has determined that a successful decode measurement has taken place, at which time a successful decode signal is conducted to either the beeper 98 and/or the light-emitting diode 99. The sound and/or the light indication advises the user that the repetitive scanning has been terminated, and that another symbol can now be scanned.

The repetitive scanning for each object results in higher reliability as compared to the prior art readers and scanners where only one manual or automatic scan is performed. In some instances, the printing of the symbol on the product is poor in terms of the contrast of the color of the lines of the symbol as compared to the color of the spaces of the symbol. In these cases, the probability of getting a successful decode on any given scan attempt for a given object (i.e., percent decode) is very low, and thus poor printing also contributes to low reliability.

It can be shown that the probability of getting at least one decode after N scans is determined by the following equation:

$$P = 1 - (1 - P.D.)^N$$

wherein
P = probability of getting at least one successful decode after N scans (%);
N = Number of scans per attempt; and
P.D. = Percent decode, i.e. the probability of getting a successful decode on any given scan (%).

If we assume that the percent decode of a given symbol is about 10% because of its poor printing, and that the laser scanning system of this invention performs about 200 scans a second, then:

$$\begin{aligned}
P &= 1 - (1 - .10)^{200} \\
&= 1 - (.9)^{200} \\
&= 1 - (\approx 0) \\
&= 1 \text{ or } 100\% \text{ probability of success}
\end{aligned}$$

By contrast, for prior art readers and scanners which only scan once for an object, then:

$$\begin{aligned}
P &= 1 - (1 - .10)^1 \\
&= 1 - (.9)^1 \\
&= .1 \text{ or } 10\% \text{ probability of success.}
\end{aligned}$$

The virtual certainty (100%) of getting a successful decode using repetitive scanning even for poorly printed symbols which have only a 1 in 10 chance of being successfully decoded, as compared to the very low certainty (10%) for the prior art devices illustrates the high reliability of our invention.

In the event that no successful decode measurement has been made, then the trigger means is operative to terminate the repetitive scanning upon elapse of a predetermined time period as measured from actuation of the trigger. The predetermined time period, typically on the order of three seconds, is selected to provide the user with sufficient time to sight the object.

Scanning will also be automatically terminated if the trigger is released before the aforementioned three second time period has lapsed and before a successful decode measurement has been obtained.

Another or the same visual and/or auditory indicator can be used to indicate that the scanner system has not successfully decoded the symbol to be read.

IV. LASER DIODE SCANNER

The means for generating a laser beam need not be the laser tube 24, as described above, but may be a semiconductor laser diode 200, as shown in FIG. 12. The laser diode may be of the continuous wave-or pulse-type. Such laser diodes are commercially available from many sources, such as the General Optronics Corporation, Laser Diode, Inc., and Optical Information Systems, Inc.

The laser diode 200 is mounted in the head 10. In one preferred mounting arrangement, the diode 200 is mounted on a heat sink 202 which is threadedly mounted to the head 10. The diode 200 is much smaller in size and lighter in weight as compared to the laser tube 24. Hence, the use of a laser diode is particularly desirable for applications where weight requirements, on the order of less than one pound, and size requirements, on the order of less than fifty cubic inches, are to be kept to a bare minimum.

Moreover, in contrast to the laser tube 24 which requires a high voltage (i.e. 650 v DC) power supply and a low voltage (i.e. 12 v DC) power supply, the laser diode 200 only requires a low voltage (i.e. 12 v DC) power supply. The elimination of the high voltage power supply 50 conserves even more space and weight.

The laser diode 200 is formed with a generally rectangular cavity or laser-emitting aperture 204 which measures about one micron $\times$ ten microns. The emitted laser beam diverges outwardly from the aperture 204 and has an asymmetrical angular splay which measures about $10°-20° \times 40°-50°$. The lens system 206 is designed with a numerical aperture on the order of 0.25, a net magnification from about 10X to about 15X, and an f number on the order of about f/2. The scanning means and signal processing means have been omitted from FIG. 12 for the sake of clarity.

Due to the rectangular exit aperture 204, the axial cross-section of the beam spot is likewise generally rectangular or oval in shape. The elongated beam spot at the reference plane is on the order of 6 mils $\times$ 1 mil. The longer dimension of the elongated spot is aligned along the height of the symbol to be scanned. The shorter dimension of the elongated spot is aligned along the length of the symbol to be scanned.

Scanning with a rectangular or oval beam spot is more desirable than scanning with a circular beam spot, because the elongated spot generates electrical signals having more abrupt amplitude changes as the elongated spot moves across a dark-light transition on the symbol. When an elongated spot is juxtaposed with a dark line on the symbol, variations in line width over the entire height of the line are averaged out. When the elongated spot thereupon moves into the next space, the transition is more abrupt for an elongation spot as compared to a circular spot. This greater resolution capability reduces decoding errors, particularly for symbols where the contrast between the printed lines and spaces is poor.

The lens system 206 is designed to allow for a small angular tilt of about 10° to about 15° in the alignment of the elongated spot relative to the lines of the symbol.

V. PENTA-BIMORPH SCANNING ELEMENT

Turning now to FIG. 15, a penta-bimorph scanning element is generally identified by reference numeral 250. The penta-bimorph 250 is a miniature, high-speed scanning element which can replace either the X-axis scanning element 68, or the Y-axis scanning element 70, or both.

The penta-bimorph 250 comprises a pair of bimorphs 252, 254 which are ferro-electric-type oscillating elements which reciprocally oscillate when voltages are applied thereto. At their lower ends, the bimorphs are mounted on a grounded support structure 256. At their upper ends, light-reflecting mirrors 262, 264 are mounted on the bimorphs such that they include a 45° angle between their reflecting surfaces. Wedge-shaped blocks 258, 260 are mounted between the mirrors and the bimorphs to properly position the mirrors at the aforementioned angle.

Before describing the drive circuitry, it should be noted that the incoming light beam $L_i$ and the outgoing light beam $L_o$ include a right angle therebetween. The incoming beam impinges on mirror 264, thereupon is reflected to mirror 262, and then is reflected at a 90° angle relative to the incoming beam. More importantly, as described below, even if the entire penta-bimorph is subjected to mechanical shock, the right angle relationship between the incoming and outgoing beams is maintained throughout the scanning movement.

The bimorphs 252, 254 are driven in a manner resembling the movement of the tines of a tuning fork. For example, a voltage is applied to bimorph 252 to drive the same in an oscillatory manner in the direction of the double-headed arrow. Regenerative feedback is provided to drive the other bimorph 254. An operational amplifier 266 has its positive input terminal connected to the sensing bimorph 254. The negative terminal is connected through a capacitor 268 to the wiper arm of a gain-adjust potentiometer 270. The amplifier output is connected to the driven bimorph 252.

The drive circuitry is operative to oscillate the two bimorphs in anti-phase relationship. In other words, the two bimorphs either simultaneously move towards each other, or simultaneously move apart of each other.

Throughout the entire oscillating scanning movement, the incoming and outgoing beams always define a right angle therebetween. This is analogous to the penta-bimorph effect, wherein the beam exiting from one face always defines a 90° angle with the beam entering from another face. The establishment of a constant angular relationship between the incoming and outgoing beams is advantageous in making the penta-bimorph scanning element 250 insensitive to vibration- or shock-effects. Even if the housing in which the penta-bimorph is mounted is subjected to undesirable mechanical forces, the scanning will not be effected, because the effects of the mechanical forces are completely cancelled. Moreover, the penta-bimorph is self-compensating due to temperature, because both bimorphs will be affected in the same manner.

By adjusting the gain-adjust control of the potentiometer to a value just over the threshold for oscillation, the penta-bimorph should closely approach a harmonic oscillator.

Moreover, the penta-bimorph greatly amplifies the scanning movement. The mirror 264 doubles the amplification; the mirror 258 doubles the amplification again; and the anti-phase movement of the two mirrors doubles the amplification still again. The outgoing beam scans over a relatively long range as compared to the range over which the incoming beam is moved.

It will be understood that each of the elements described above, or two or more together, may also find a useful application in other types of constructions differing from the types described above.

While the invention has been illustrated and described as embodied in a portable laser scanning system and scanning methods, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A laser scanning system for reading bar code symbols, each in its respective turn, comprising:
   (a) a light-weight, hand-held head normally supportable by a user in a normally non-contacting relationship with the symbols during reading thereof, said head including therein
      (i) means for generating a laser beam, and for directing the same along a light path through an outlet port of the head to each symbol,
      (ii) scanning means for repetitively scanning the directed laser beam across each symbol for reflection therefrom,
      (iii) sensor means for detecting the variable intensity of each scanned laser beam reflected from each symbol, and for generating an electrical signal indicative of the detected intensity for each symbol, and
      (iv) signal processing means for processing each electrical signal, and for generating a processed electrical signal for each symbol;
   (b) decoding means operatively associated with the signal processing means, for decoding the processed signal for each symbol to be read;
   (c) manually actuatable trigger means on the head and operatively associated with the decoding means, for initiating reading of each symbol upon each manual actuation of the trigger means from one state to another state by the user; and
   (d) means operatively associated with the decoding means, for determining a successful decoding of each symbol, and for non-manually terminating the reading of each symbol upon the determination of the successful decoding thereof.

2. The laser scanning system as defined in claim 1, wherein the trigger means is returnable upon manual release thereof from said another state to said one state, and wherein the terminating means is operative for non-manually terminating the reading while the trigger means is in said another state.

3. The laser scanning system as defined in claim 1, and further comprising means for determining no successful decoding of each symbol, and for non-manually terminating the reading of each symbol upon the determination of no successful decoding thereof and upon the elapse of a predetermined time period from the actuation of the trigger means into said another state.

4. The laser scanning system as defined in claim 1, wherein the scanning means is operative for repetitively sweeping the directed laser beam a plurality of times per second across each symbol, and wherein the trigger means is operatively associated with the scanning means for actuating the latter to perform the repetitive sweeping to initiate the reading of each symbol.

5. The laser scanning system as defined in claim 1, wherein the determining means includes indicator means for advising the user, upon the determination of a successful decoding of each symbol, that the reading of the respective symbol has been non-manually terminated.

6. The laser scanning system as defined in claim 1, wherein the sensor means generates an analog electrical signal for each symbol, wherein the signal processing means processes the analog signal to generate a processed digitized signal for each symbol, and wherein the decoding means decodes the digitized signal for each symbol.

7. The laser scanning system as defined in claim 1, wherein the decoding means is located remotely from the head and is electrically connected to the latter by a non-bulky cable which has multiple freedoms of movement.

8. A laser scanning system for reading bar code symbols, each in its respective turn, comprising:
   (a) a light-weight, hand-held head normally supportable by a user in a normally non-contacting relationship with the symbols during reading thereof, said head including therein
      (i) means for generating a laser beam, and for directing the same along a light path through an outlet port of the head to each symbol,
      (ii) scanning means for repetitively scanning the directed laser beam across each symbol for reflection therefrom,
      (iii) sensor means for detecting the variable intensity of each scanned laser beam reflected from each symbol, and for generating an electrical signal indicative of the detected intensity for each symbol, and
      (iv) signal processing means for processing each electrical signal, and for generating a processed electrical signal for each symbol;
   (b) decoding means operatively associated with the signal processing means, for decoding the processed signal for each symbol to be read;
   (c) manually actuatable trigger means on the head and operatively associated with the decoding means, for initiating reading of each symbol upon manual actuation of the trigger means from one state to another state by the user; and
   (d) means operatively associated with the decoding means, for determining a successful decoding or no successful decoding of each symbol, and for non-manually terminating the reading of each symbol upon the determination of no successful decoding thereof and upon the elapse of a predetermined time period from the actuation of the trigger means into said another state.

9. The laser scanning system as defined in claim 8, wherein the trigger means is returnable upon manual release thereof from said another state to said one state, and wherein the terminating means is operative for non-manually terminating the reading while the trigger means is in said another state.

10. A laser scanning system for reading bar code symbols, each in its respective turn, comprising:
   (a) a light-weight, hand-held head normally supportable by a user in a normally non-contacting relationship with the symbols during reading thereof, said head including therein
      (i) means for generating a laser beam, and for directing the same along a light path through an outlet port of the head to each symbol,
      (ii) scanning means for repetitively scanning the directed laser beam a number of times per second across each symbol for reflection therefrom,
      (iii) sensor means for detecting the variable intensity of each scanned laser beam reflected from each symbol, and for generating an analog electrical signal indicative of the detected intensity for each symbol, and
      (iv) signal processing means for processing each analog electrical signal, and for generating a processed digitized electrical signal for each symbol;
   (b) decoding means operatively associated with the signal processing means, for decoding the processed digitized signal for each symbol to be read;
   (c) power supply means operatively connected to, and supplying power for, the laser beam generating means, the scanning means, the sensor means, the signal processing means, and the decoding means, said power supply means including a direct current power supply component mounted in the head and energizeable by a low voltage direct current signal, and a non-bulky cable connecting the head to the decoding means, said non-bulky cable including a flexible conductor for carrying the low voltage direct current signal for energizing the power supply component, said non-bulky cable also including another flexible conductor for conducting the digitized signal from the signal processing means in the head to the decoding means, said non-bulky cable being readily flexible to permit user manipulation of the head with multiple freedoms of movement from one symbol to the next;
   (d) manually actuatable trigger means on the head and operatively associated with the decoding means, for initiating reading of each symbol upon each manual actuation of the trigger means from one state to another state by the user; and
   (e) means operatively associated with the decoding means for determining a successful decoding of each symbol, and for non-manually terminating the reading of each symbol upon the determination of the successful decoding thereof.

11. A method of successively sensing and reading bar code symbols, each in its respective turn, comprising the steps of:
   (a) generating a laser beam, and directing the same along a light path to each symbol;
   (b) repetitively scanning the directed laser beam across each symbol for reflection therefrom;
   (c) detecting the variable intensity of each scanned laser beam reflected from each symbol, and generating an electrical signal indicative of the detected intensity for each symbol;
   (d) processing each electrical signal, and generating a processed electrical signal for each symbol;
   (e) performing steps (a), (b), (c) and (d) in a light-weight, hand-held head, and normally supporting the same by a user in a normally non-contacting relationship with the symbols during reading thereof;
   (f) decoding the processed signal for each symbol to be read;
   (g) initiating reading of each symbol upon each manual actuation from one state to another state of a trigger by the user; and
   (h) determining a successful decoding of each symbol, and non-manually terminating the reading of each symbol upon the determination of the successful decoding thereof.

12. The method as defined in claim 11, wherein the trigger is returnable upon manual release thereof from said another state to said one state, and wherein the terminating step is performed by non-manually terminating the reading while the trigger is in said another state.

13. The method as defined in claim 11, and further comprising the step of determining no successful decoding of each symbol, and non-manually terminating the reading of each symbol upon the determination of no successful decoding thereof and upon the elapse of a predetermined time period from the actuation of the trigger into said another state.

14. The method as defined in claim 11, wherein the initiating reading step is performed by repetitively sweeping the directed laser beam a plurality of times per second across each symbol.

15. The method as defined in claim 11, wherein the determining step includes advising the user, upon the determination of a successful decoding of each symbol, that the reading of the respective symbol has been non-manually terminated.

16. An entirely field-portable data collection system for reading bar code symbols, each in its respective turn, comprising:
 (a) a light-weight, hand-held laser scanning housing normally supportable by a user in a normally non-contacting relationship with the symbols during reading thereof;
 (b) means in the housing for generating a laser beam;
 (c) means in the housing for directing the laser beam along a light path through an outlet port of the housing to each symbol;
 (d) means in the housing for repetitively scanning the directed laser beam across each symbol for reflection therefrom;
 (e) means in the housing for detecting the variable intensity of each scanned laser beam reflected from each symbol, and for generating an electrical signal indicative of the detected intensity for each symbol;
 (f) means in the housing for processing each electrical signal, and for generating a processed electrical signal for each symbol;
 (g) means in the housing for decoding the processed signal for each symbol to be read;
 (h) manually actuatable trigger means on the housing for initiating reading of each symbol upon each manual actuation of the trigger means from one state to another by the user;
 (i) means in the housing for determining a successful decoding of each symbol, and for non-manually terminating the reading of each symbol upon the determination of the successful decoding thereof;
 (j) means in the housing for storing data collection information; and
 (k) means in the housing for supplying power to the system.

* * * * *